(12) United States Patent
Buckler et al.

(10) Patent No.: US 8,352,798 B2
(45) Date of Patent: Jan. 8, 2013

(54) FAILURE DETECTION AND FENCING IN A COMPUTING SYSTEM

(75) Inventors: Andrew David Buckler, Markham (CA); Christian Marcelo Garcia-Arellano, Markham (CA); David Alan Hepkin, Austin, TX (US); Matthew Albert Huras, Toronto (CA); Aamer Sachedina, Markham (CA)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 12/635,338

(22) Filed: Dec. 10, 2009

(65) Prior Publication Data

US 2011/0145635 A1     Jun. 16, 2011

(51) Int. Cl.
    *G06F 11/00* (2006.01)
(52) U.S. Cl. ...................................... 714/38.1
(58) Field of Classification Search ............ 714/38, 714/38.1
    See application file for complete search history.

(56) References Cited

U.S. PATENT DOCUMENTS

| 5,533,195 | A | 7/1996 | LaRochelle et al. | |
| 6,367,029 | B1 | 4/2002 | Mayhead et al. | |
| 7,082,555 | B2 | 7/2006 | Toyooka et al. | |
| 2003/0037290 | A1* | 2/2003 | Price et al. | 714/38 |
| 2004/0078686 | A1 | 4/2004 | Toyooka et al. | |
| 2007/0083794 | A1* | 4/2007 | Yu | 714/38 |
| 2008/0256312 | A1* | 10/2008 | Lehr et al. | 711/162 |
| 2009/0100288 | A1 | 4/2009 | Khurana et al. | |
| 2009/0222697 | A1 | 9/2009 | Thakkar et al. | |

FOREIGN PATENT DOCUMENTS

| EP | 0479230 A2 | 4/1992 |
| WO | 9824222 A2 | 6/1998 |

* cited by examiner

*Primary Examiner* — Scott Baderman
*Assistant Examiner* — Jigar Patel
(74) *Attorney, Agent, or Firm* — Elissa Wang; Edell, Shapiro & Finnan, LLC

(57) ABSTRACT

A method, computer program product, and system for detecting and fencing off a failed entity instance so that failover time in the computing system is reduced. Upon detection of a failed entity, for example a failed process, a signal handler invokes an operating system interface to fence off the failed instance from modifying its persistent state, so that the entity may be re-instantiated prior to termination of the failed instance. This approach reduces failover time and eliminates split-brain problems without compromising access to the failed instance to obtain diagnostic information, core dumps, and the like.

14 Claims, 4 Drawing Sheets

US 8,352,798 B2

FAILURE DETECTION AND FENCING IN A COMPUTING SYSTEM

BACKGROUND

1. Technical Field

The present invention relates generally to failure detection and fencing in a computing system, and more particularly to detecting and fencing off a failed entity instance so that failover time in the computing system is reduced.

2. Discussion of Related Art

Many computing systems maintain important state information on persistent media. For example a database system typically stores the actual data of the database in persistent media. When such systems experience a critical failure, it is desirable to restart the system as quickly as possible, either on the same host computer, or on a different computer that has access to the same persistent media. The overall goal is to minimize the period of time that the system is unavailable for use by end users (known as "failover time"). Mechanisms used to automate this failure recovery include polling techniques to determine if the system is healthy, and event-based techniques that generate an event if the system experiences a critical failure.

An example of a polling-based technique is one that regularly sends status requests (e.g., "are you alive" messages) to the system in question, and waits for a certain amount of time (a timeout period) to receive a positive response. If a positive response is not received within the timeout period, the system is declared failed, and additional actions are taken such as re-starting the system (e.g., starting a new instantiation of the system). An example of an event-based mechanism is registering a handler for the SIGCHLD signal that is generated when a child process fails, and, in the handler, initiating the restart of the system. These techniques have significant drawbacks, for example, polling requires extra CPU cycles to perform the polling (e.g., the CPU cycles associated with sending and responding to the messages), and experiences a significant delay in the detection of the death of the system, and event-based techniques may experience significant delays before the event is generated. For example, a SIGCHLD is typically not generated until all diagnostic information necessary for root cause analysis of the error (e.g., core dumps and other dumps) are complete, which can result in a delay of several seconds or more.

BRIEF SUMMARY

Accordingly, embodiments of the present invention include a method, computer program product and a system for detecting and fencing off a failed entity instance comprising detecting a failure occurring during execution of a first instance of a software entity, where the first instance comprises one or more threads of execution, and is capable of performing a write operation on state information stored in non-volatile memory and associated with the software entity. In response to said detection, an operating system interface is invoked to quiesce any in-progress write operations on the state information associated with the software entity, and in response to said quiescence, the software entity is re-instantiated to create a second instance of the software entity, where the second instance comprises one or more threads of execution, and is capable of performing a write operation on the state information associated with the software entity. In response to said quiescence, diagnostic information is obtained from the first instance, and in response to obtaining the diagnostic information, the first instance is terminated.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
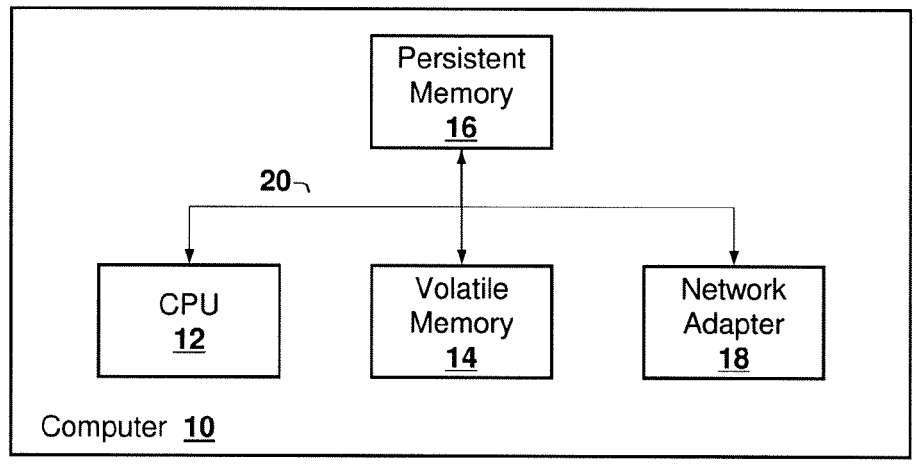
FIG. 1 is a block diagram illustrating an exemplary computing system according to an embodiment of the present invention.

Referring now to the Figures, an exemplary computer system according to embodiments of the present invention is illustrated in FIG. 1. FIG. 1 shows a computer system 10 comprising processor 12, volatile memory 14, persistent or non-volatile memory 16, and network adapter 18, all communicatively coupled together by system bus 20. The system 10 may include additional servers, clients, and other devices not shown, and individual components of the system may occur either singly or in multiples, for example, there may be more than one data storage area in the system. The system 10 may also be a node, for example a node in a computing cluster, which is connected to other nodes by suitable means, for example via a network.

The computer system 10 may be implemented in the form of a processing system, or may be in the form of software. The computer system 10 may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Treo, iPhone, etc.), etc., and may include any commercially available operating system (e.g., AIX®, Linux®, OSX, Sun Solaris, UNIX®, Windows®, etc.) and any commercially available or custom software (e.g., browser software, communications software, word processing software, etc.). AIX® is a trademark or registered trademark of International Business Machines Corporation in the United States, other countries, or both. Linux® is a registered trademark of Linus Torvalds in the United States, other countries, or both. UNIX® is a registered trademark of The Open Group in the United States and other countries. Windows® is a trademark of Microsoft Corporation in the United States, other countries, or both.

These systems may include types of displays and input devices (e.g., keyboard, mouse, voice recognition, etc.) to enter and/or view information. If embodied in software (e.g., as a virtual image), the computer system 10 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Volatile memory 14 may be implemented by any conventional or other volatile memory or storage device (e.g., RAM, cache, flash, etc.), and may include any suitable storage capacity. Persistent or non-volatile memory 16 may be implemented by any conventional or other non-volatile memory or storage device (e.g., ROM, hard-disk, optical storage, etc.), and may include any suitable storage capacity. The persistent or non-volatile memory 16 may comprise data storage systems, such as conventional or other databases (e.g., network, hierarchical, relational, object, etc.) or storage structures (e.g., files, data structures, web-based storage, disk or other storage, etc.).

The network adapter 18 may be implemented so that the computer system 10 can communicate with one or more other systems by any quantity of any suitable communications media (e.g., WAN, LAN, Internet, Intranet, wired, wireless, etc.), through a shared memory, or in any other suitable fashion. The computer systems of the present embodiments may include any conventional or other communications devices to communicate over networks or other communications channels via any conventional or other protocols, and may utilize any type of connection (e.g., wired, wireless, etc.) for access.

FIGS. 2A through 2E are a series of block diagrams illustrating various steps of an exemplary failure detecting and fencing process according to an embodiment of the present invention. Each of these block diagrams depicts an exemplary system 100 comprising various modules and entities, which may operate in the computer system of FIG. 1, or in any other suitable computing system. The exemplary system comprises optional diagnostic module 31, a signal handler 32, a monitoring module 33, and an operating system interface 34, as well as persistent storage 35, which may, for example, comprise any suitable data storage system for storing application data, state information, or any other information desired to be stored in a persistent fashion in a computing system.

Figure 2A:
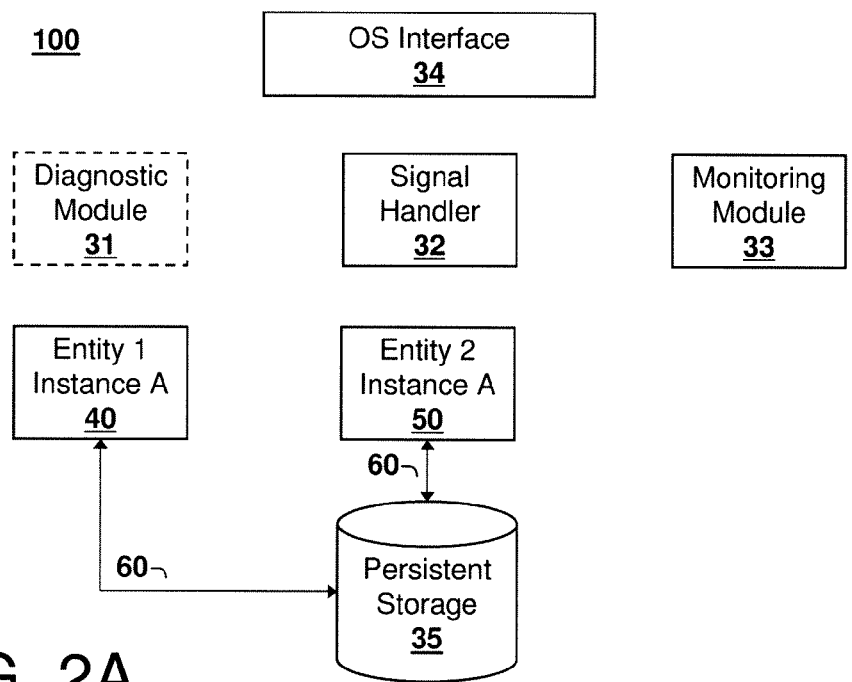
FIGS. 2A through 2E are block diagrams illustrating an exemplary failure detecting and fencing process according to an embodiment of the present invention.

The system 100 also comprises one or more entities, for example in FIG. 2A there are two entities 40, 50 depicted, which each have a single instance ("Instance A") executing. The entities may be any entity in a computing system that can fail, and that can be fenced off from performing write requests on the persistent storage 35. For example, the entity may be a cluster of computers, a particular node in a cluster, a cluster of applications, a particular application, a process, a thread, or any other entity at any other level of granulation. Each instance of each entity may communicate with the persistent storage 35, for example by I/O operations 60 such as write requests. The communication may be for any suitable purpose, for example the entity instance may be an application that stores data in the persistent storage 35, a process that stores state information in the persistent storage 35, etc.

Figure 2B:
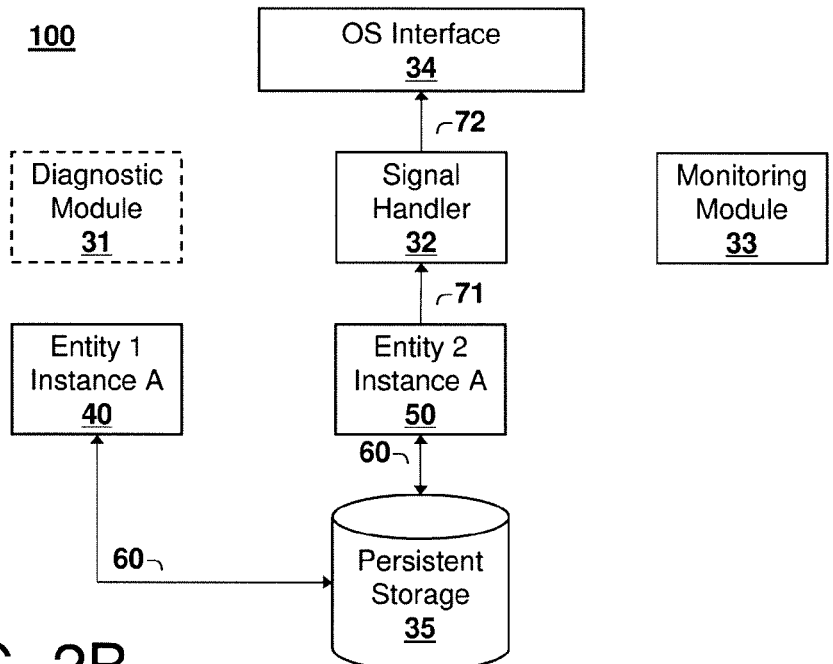

In FIG. 2B, the current instance 50 of Entity 2 fails, and sends a notification 71 to the signal handler 32 advising of this failure. The failure may be any type of failure event or malfunction that allows the instance to take action. For example, an operating system failure, a software failure, a hardware failure that does not instantly terminate the computing node, or a combination of any of these. Upon receipt of the notification, the signal handler invokes, by sending command 72, the operating system (OS) interface 34 for the purpose of fencing off the failed instance and restart the entity, e.g., by starting a new instance of the failed entity. Although the depicted example illustrates a single invocation of the OS interface, the signal handler may invoke the OS interface multiple times, for example once per each action that the OS interface is desired to perform.

Fencing off the entity instance prevents it from modifying its persistent state and writing to the persistent storage, while still allowing it to be accessed in order to record or obtain failure diagnostic information, generate a core dump, and the like. Once the failed entity instance is fenced off, the possibility of a "split brain" situation is eliminated, thus allowing a new instance of the entity to be started before the failed entity instance has completely terminated. Accordingly, as compared to conventional systems that prevent a new instance from being started until after the termination of a failed instance, the present embodiments reduce the failover time and the period of availability restriction by a very significant period of time, without compromising the ability to diagnose the root cause of the failure, providing a significant benefit to the end-user of the system.

Figure 2C:
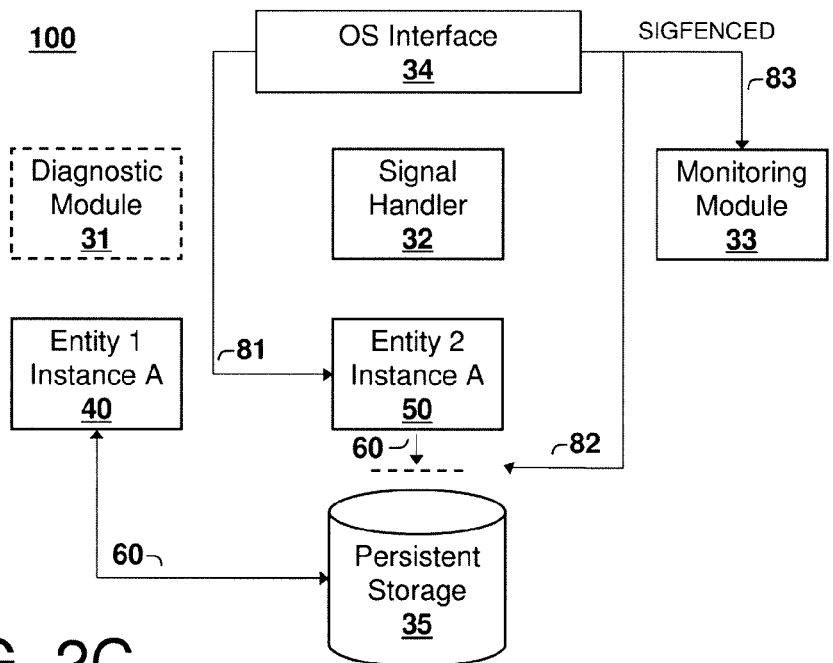

In FIG. 2C, the OS interface 34 fences off the failed instance 50, by, for example, suspending all threads and processes in the failed instance via command 81, quiescing all in-progress I/O operations that may affect the instance's persistent state via command 82, and by notifying the monitoring module 33 via command 83 that the failed instance has been fenced off and that a new instance of the entity may be instantiated. The notification command 83 may be, for example, delivered as a SIGFENCED signal, and may be delivered to the monitoring module 33 as shown, to a parent process, or to any other process that is capable of re-instantiating the failed entity.

Figure 2D:
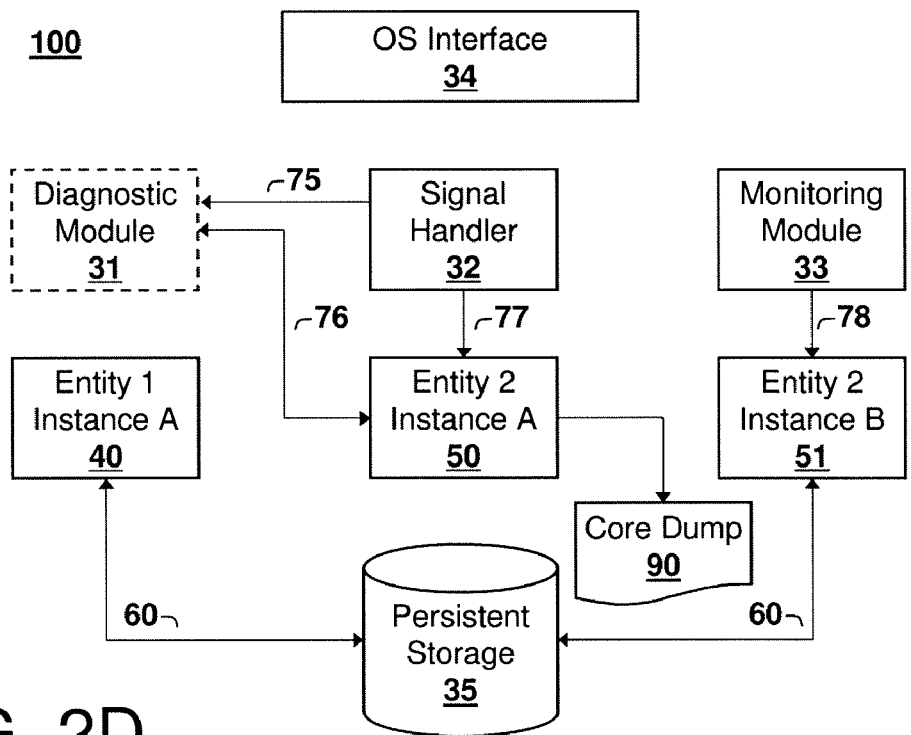
Figure 2E:
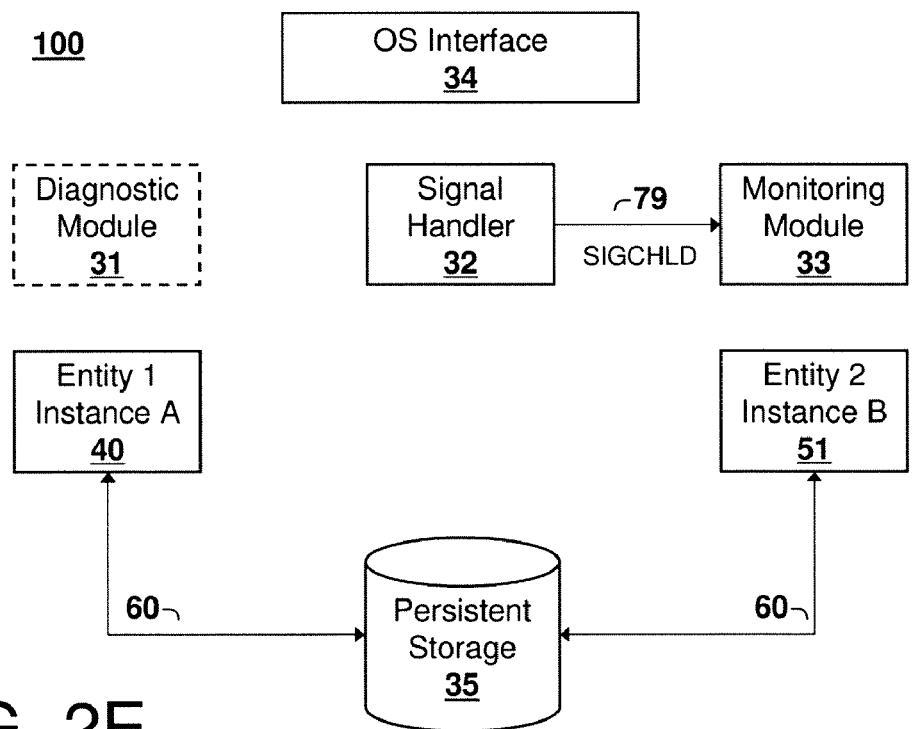

In FIG. 2D, the monitoring module 33 or other recipient of the fenced-off notification command instantiates a new instance 51 of the failed entity, which may communicate with the persistent storage 35, for example by I/O operations 60 such as write requests. Now that the failed instance 50 is fenced off, the signal handler 32 may record diagnostic information that may be used for root cause analysis of the failure, may spawn an additional thread or threads to record the information in parallel, or, optionally, may direct a diagnostic module 31 via command 75 to record the information via recording operation 76 as depicted. The signal handler 32 may also direct the failed instance 50 to generate a core dump 90 via command 77. As will be apparent to those skilled in the art, these steps such as recording diagnostic information and generating a core dump should be performed against the appropriate target (e.g., a directory or file name) that is specific to the failed instance, to ensure that information collected during a prior failure is not overwritten during these processes.

After all desired actions, such as recording diagnostic information and generating core dumps, have been performed, the failed instance 50 is terminated, and exit processing such as the release of process resources, the clean-up and release of interprocess communications resources, and the like is performed. An exit notification, e.g., a SIGCHLD signal 79 is then sent to the monitoring module 33, a parent process, or to any other suitable process. Meanwhile, the new instance 51 of the failed entity continues to operate.

Figure 3:
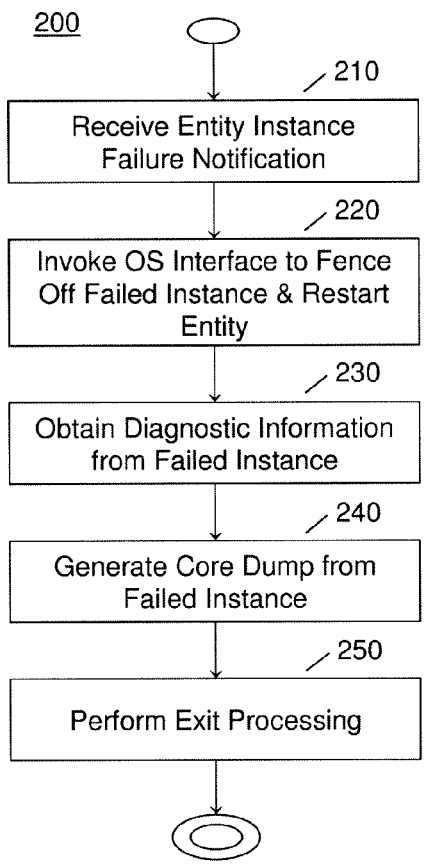
FIGS. 3 through 5 are flowcharts depicting various aspects of an exemplary failure detection and fencing process according to embodiments of the present invention.
Figure 4:
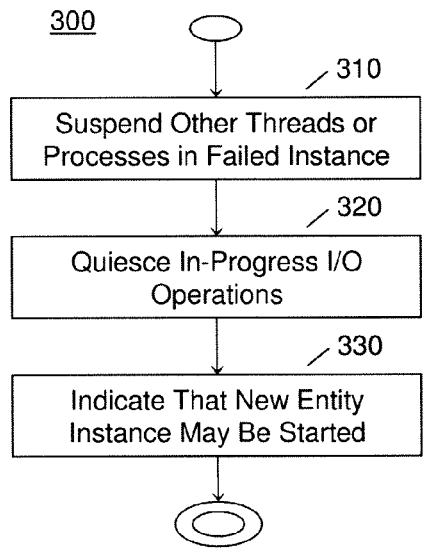
Figure 5:
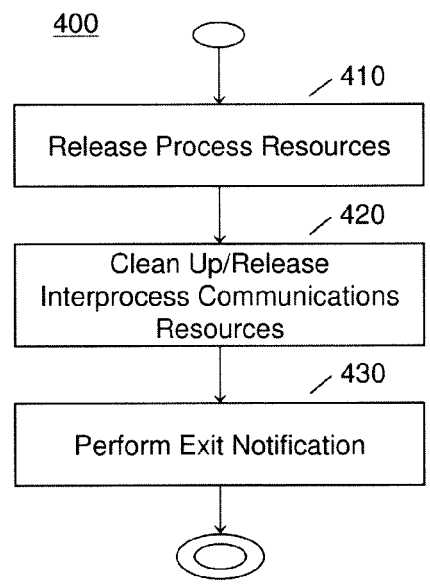

Turning now to FIGS. 3 through 5, processes 200, 300 and 400 for an exemplary failure detection and fencing process are shown generally. In process 200, the system, for example the signal handler 32, receives at step 210 a failure notification from an instance of an entity, for example a process. In step 220, the signal handler invokes an operating system (OS) interface to fence off the failed instance and to restart (e.g., re-instantiate) the failed entity. In step 230, the signal handler obtains, or directs another entity to obtain, diagnostic information from the failed entity, and in step 240 the signal handler directs the generation of a core dump from the failed instance. In step 250, the system performs exit processing and terminates the failed instance.

FIG. 4 depicts process 300, which includes details of the fencing process, and which may be performed by the OS interface. In step 310, the OS interface suspends other threads or processes in the failed instance, if the entity is a process or application, or other nodes in the failed instance, if the entity is a cluster of computing nodes, etc. In step 320, the OS interface quiesces all in-progress I/O operations that may affect the entity's persistent state, and in step 320, indicates that the failed instance has been fenced off and that a new instance of the entity may be instantiated. This indication or notification may be, for example, delivered as a SIGFENCED signal from the OS interface to a monitoring module, a parent process, or to any other process that is capable of re-instantiating the failed entity. It should be noted that while the combination of FIGS. 3 and 4 illustrates an example in which the OS interface is invoked once by the signal handler, the embodiments are not so limited, and the signal handler may invoke the OS interface more than once, for example at least once for every step in process 300.

FIG. 5 depicts process 400, which includes details of the exit process, and which may be performed by various resources including the signal handler. In step 410, process resources are released, in step 420, interprocess communications resources are cleaned-up and released, and in step 430 an exit notification, e.g., a SIGCHLD signal, is sent to the monitoring module, a parent process, or to any other suitable process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. Java™ and all Java-based trademarks and logos are trademarks of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java™, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting and fencing off a failed entity instance comprising:

detecting a failure occurring during execution of a first instance of a software entity, wherein the software entity is an application or process and the first instance comprises one or more threads of execution, and is capable of performing a write operation on state information stored in non-volatile memory and associated with the software entity;

in response to said detection, invoking an operating system interface to create a quiesced state of the first instance by stopping any in-progress write operations on the state information associated with the first instance of the software entity and by suspending execution of the one or more threads of execution in the first instance;

in response to said quiesced state of the first instance, re-instantiating the software entity to create a second instance of the software entity such that the first and second instances are executing at the same time, wherein the second instance comprises one or more threads of execution, and is capable of performing a write operation on the state information associated with the software entity;

in response to said quiesced state of the first instance, obtaining diagnostic information from the first instance; and in response to obtaining the diagnostic information, terminating the first instance.

2. The method of claim 1, further comprising, in response to said quiesced state, invoking the operating system interface to send a signal to a monitoring process signifying that the first instance has been fenced off, wherein said re-instantiation is responsive to the signal.

3. The method of claim 1, further comprising, in response to said quiesced state, generating a core dump from the first instance.

4. The method of claim 1, further comprising, in response to said termination, sending a SIGCHLD signal to a monitoring process signifying that the first instance has terminated.

5. A computer program product comprising a computer useable memory device having a computer readable program stored thereon, wherein the computer readable program when executed on a computer causes the computer to:

detect a failure occurring during execution of a first instance of a software entity, wherein the software entity is an application or process and the first instance comprises one or more threads of execution, and is capable of performing a write operation on state information stored in non-volatile memory and associated with the software entity;

in response to said detection, invoke an operating system interface to create a quiesced state of the first instance by stopping any in-progress write operations on the state information associated with the first instance of the software entity and by suspending execution of the one or more threads of execution in the first instance;

in response to said quiesced state of the first instance, re-instantiate the software entity to create a second instance of the software entity such that the first and second instances are executing at the same time, wherein the second instance comprises one or more threads of execution, and is capable of performing a write operation on the state information associated with the software entity;

in response to said quiesced state of the first instance, obtain diagnostic information from the first instance; and in response to obtaining the diagnostic information, terminate the first instance.

6. The computer program product of claim 5, wherein the computer readable program when executed on a computer further causes the computer to:

in response to said quiesced state, invoke the operating system interface to send a signal to a monitoring process signifying that the first instance has been fenced off, wherein said re-instantiation is responsive to the signal.

7. The computer program product of claim 5, wherein the computer readable program when executed on a computer further causes the computer to:

in response to said quiesced state, generate a core dump from the first instance.

8. The computer program product of claim 5, wherein the computer readable program when executed on a computer further causes the computer to:

in response to said termination, send a SIGCHLD signal to a monitoring process signifying that the first instance has terminated.

9. The computer program product of claim 5, wherein the computer program product is stored on a computer useable optical storage medium.

10. The computer program product of claim 5, wherein the computer program product is stored on a hard disk.

11. A system comprising:

non-volatile memory having state information stored therein, wherein the state information is associated with a software entity; and a processor configured with logic to detect a failure occurring during execution of a first instance of the software entity, wherein the software entity is an application or process and the first instance comprises one or more threads of execution, and is capable of performing a write operation on the state information, in response to said detection, invoke an operating system interface to create a quiesced state of the first instance by stopping any in-progress write operations on the first instance of the state information and by suspending execution of the one or more threads of execution in the first instance, in response to said quiesced state of the first instance, re-instantiate the software entity to create a second instance of the software entity such that the first and second instances are executing at the same time, wherein the second instance comprises one or more threads of execution, and is capable of performing a write operation on the state information, in response to said quiesced state of the first instance, obtain diagnostic information from the first instance, and in response to obtaining the diagnostic information, terminate the first instance.

12. The system of claim 11, wherein the processor is further configured with the logic to:

in response to said quiesced state, invoke the operating system interface to send a signal to a monitoring process signifying that the first instance has been fenced off, wherein said re-instantiation is responsive to the signal.

13. The system of claim 11, wherein the processor is further configured with the logic to:

in response to said quiesced state, generate a core dump from the first instance.

14. The system of claim 11, wherein the processor is further configured with the logic to:

in response to said termination, send a SIGCHLD signal to a monitoring process signifying that the first instance has terminated.

* * * * *